(12) United States Patent
Sawada et al.

(10) Patent No.: US 6,512,924 B2
(45) Date of Patent: *Jan. 28, 2003

(54) MOBILE COMMUNICATIONS SYSTEM

(75) Inventors: Masahiro Sawada, Kanagawa (JP); Yasuo Maruyama, Kanagawa (JP); Masami Yabusaki, Kanagawa (JP)

(73) Assignee: NTT Mobile Communications Network Inc., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/323,413

(22) Filed: Jun. 1, 1999

(65) Prior Publication Data

US 2002/0072368 A1 Jun. 13, 2002

Related U.S. Application Data

(63) Continuation of application No. PCT/JP98/04421, filed on Sep. 30, 1998.

(30) Foreign Application Priority Data

Oct. 1, 1997 (JP) .............................................. 9-268925

(51) Int. Cl.[7] .................................................. H04Q 7/38
(52) U.S. Cl. ........................ 455/435; 455/456; 455/432; 455/433
(58) Field of Search ................................ 455/432, 433, 455/435, 436, 552, 553, 510, 517; 370/320, 329, 331, 335

(56) References Cited

U.S. PATENT DOCUMENTS 5,642,398 A * 6/1997 Tiedemann, Jr. et al. ... 455/435
5,855,003 A * 12/1998 Ladden et al. ............... 704/270
5,867,784 A * 2/1999 Lantto .......................... 455/432
5,878,036 A * 3/1999 Spartz .......................... 370/335
5,953,666 A * 9/1999 Lehtimaki .................... 455/439
5,991,642 A * 11/1999 Watanabe et al. ............ 455/560
6,006,091 A * 12/1999 Lupien ......................... 455/435
6,108,560 A * 8/2000 Navaro et al. ............... 455/517
6,161,085 A * 12/2000 Haavisto et al. ............. 704/201
6,243,590 B1 * 6/2001 Reddy et al. ................ 455/510

FOREIGN PATENT DOCUMENTS

JP 07030947 A 1/1995

OTHER PUBLICATIONS

International Search Reports (in English and Japanese) for International Application No. PCT/JP98/04421, with search reports mailed Dec. 8, 1998.

* cited by examiner

Primary Examiner—Vivian Chin
Assistant Examiner—Duc Nguyen
(74) Attorney, Agent, or Firm—Brown Raysman Millstein Felder & Steiner LLP

(57) ABSTRACT

To register current codec types of a mobile station with a network side, the mobile station 11 notifies, when it conducts the location registration or a mobile user replaces his or her old mobile station, a visitor location switching system 5, which is associated with the current location of the mobile station, of the codec types supported by the mobile station 11 using a mobile communication control signal between the mobile station and the mobile network. Receiving the notification, the visitor location switching system 5 enters the update of the codec types into a location register 41 in a memory home station that controls the mobile network 2. The codec types can be thus registered into the mobile network 2 using the mobile communication control signal. Since the mobile network 2 can always acquire the latest codec types for the mobile station, the discrepancy is canceled between the codecs the mobile station supports and the codecs the network registers.

7 Claims, 6 Drawing Sheets

MOBILE COMMUNICATIONS SYSTEM

This application is a continuation under 35 U.S.C. §120 and §365 of International Application No. PCT/JP98/04421, filed Sep. 30, 1998, which in turn claims priority of Japanese Patent Application No. 268925, filed Oct. 1, 1997, both of which are incorporated herein by reference.

TECHNICAL FIELD

The present invention relates to a mobile communications system, and more particularly to a method for reducing call loss in a mobile communications system that registers mobile user codec types in a database in a mobile network, and conducts protocol negotiation using the codec types.

BACKGROUND ART

In a conventional mobile communications system, the registration of a mobile user codec type into a location register, a database in a mobile network, is conducted on the premise that a mobile communication carrier executes it through a maintenance control line in response to a request from a user.

This will be explained with reference to FIG. 1. In FIG. 1, a user 1 notifies a carrier of the change of his or her mobile station, that is, the change of a codec type, through a certain communication means like a postal card. A system operator (SO) of the carrier registers through a terminal 3 the change of the mobile station by the user, that is, the change of the codec type, into a home memory station 4 including a location register (database) that registers the current location of the mobile station. Thus, the change of the mobile station by the user 1, the change of the codec type, is registered in a mobile network system side (switching system/switching center side) 2 (refer to "a code matching method" disclosed in Japanese Patent Application No. 4-55267 (Laying-open No. 6-6295) assigned to the same assignee of the present application).

Conventionally, the mobile user codec types are registered in the location register, the database, in a home memory station that registers the locations or the like. Such a registration method, however, has a problem in that it takes a rather long time to update the registration because the carrier conducts the registration using the maintenance control processing at the request of the user. This sometimes causes a discrepancy between the mobile station the user actually uses and the information in the location register, thereby resulting in a call loss.

Furthermore, the call loss also takes place when a codec out of service by the mobile network is decided in the negotiation conducted between the mobile network and the mobile station when a plurality of codecs are assigned to the mobile station, and one of them is to be selected. This will be described with reference to FIG. 2.

In FIG. 2, a location register 41 in the home memory station 4 stores two codecs P1 and P2 selectable by a mobile station 11. However, a visitor location switching system (switching center) 5 associated with the current location of the mobile station 11 offers a service of only the codec P2. When a mobile station 12 calls the mobile station 11 in this state, the negotiation for selecting the codec begins between the calling mobile station 12 and the mobile network.

During the negotiation, the calling mobile station 12 calls the mobile station 11. The location register 41 associated with the mobile station 11 registers that the mobile station 11 can select one of the codec types P1 and P2. It reads them, and notifies the calling mobile station of them (1). Since the mobile station 12 can also select one of the codecs P1 and P2, it selects P1 as the codec (2), and tries to establish a channel with the mobile station 11 in the mobile network (3). However, since the visitor location switching system 5 associated with the current location of the mobile station 11 does not support the codec P1, it cannot provides the service, resulting in the call loss.

DISCLOSURE OF THE INVENTION

An object of the present invention is to achieve quick registration for updating the mobile user codec type into the location register (database) to maintain consistency of data between users and a mobile network side.

Another object of the present invention is to prevent the call loss due to the discrepancy between the codec types available by the network side and the codec type selected as described above.

There is provided a mobile communications system including a mobile station and a database of a network which registers a location of the mobile station, wherein the mobile station notifies, when it conducts mobile station location registration or when a mobile user replaces an old mobile station, the mobile network of one or more codec types supported by the mobile station; and the database of the network updates registered codec types using the codec types notified.

Using the mobile communications control signal makes it possible to quickly achieve the update of the codec types of the mobile station in the database in the mobile network, and to maintain the consistency of the data between the user side and the network side.

Here, the mobile network may comprise a switching center interposed between the mobile station and the database; and the switching center may transfer to the database only a codec type supported by the switching center among the codec types sent from the mobile station.

Since only the codec types the mobile network associated with the current location of the mobile station are entered into a location register from among the codec types supported by the mobile station, the call loss such as described above can be eliminated.

The mobile station can notify the mobile network of the codec types by adding them to the location registration request, or independently of the location registration request.

One aspect of the present invention includes a mobile station in the mobile communication system.

BEST MODE FOR CARRYING OUT THE INVENTION

The invention will now be described with reference to the accompanying drawings.

First, a codec type registration will be described referring to FIGS. 3 and 4.

Figure 1:
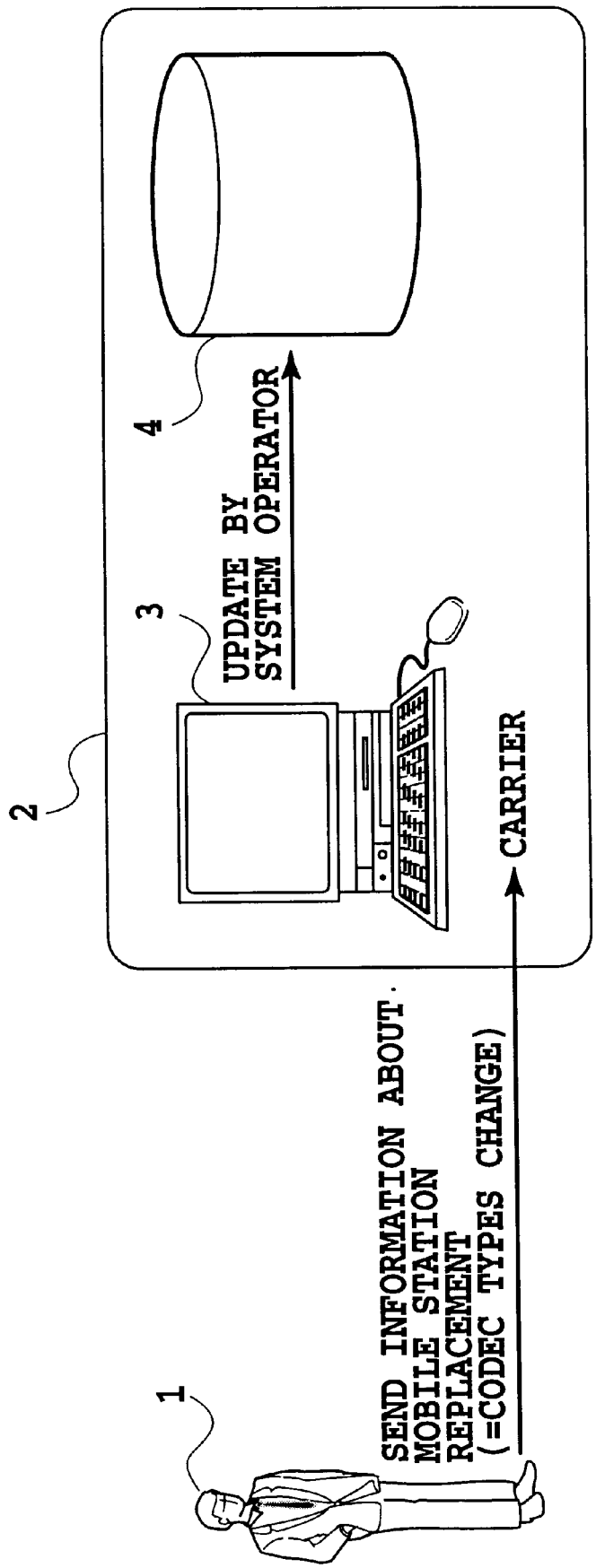
FIG. 1 is a block diagram illustrating a conventional registration method of a codec type of a mobile station.
Figure 2:
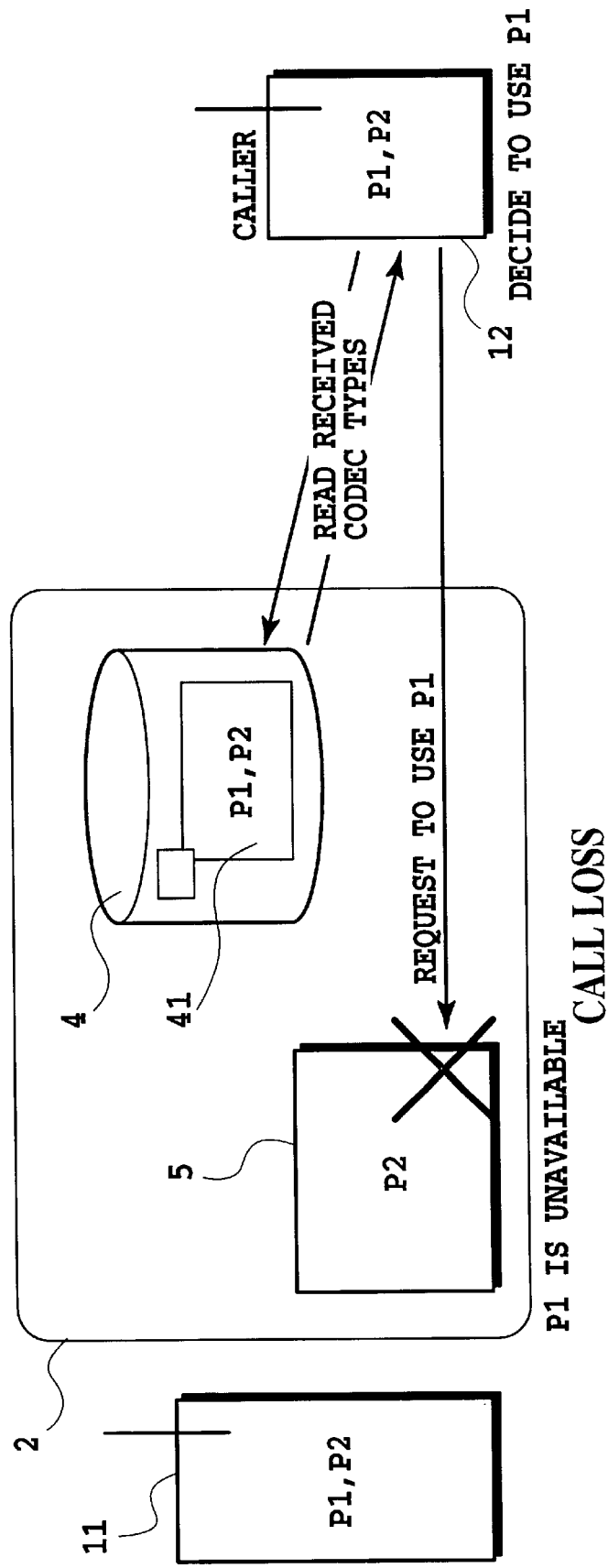
FIG. 2 is a block diagram illustrating a way a call loss takes place.
Figure 3:
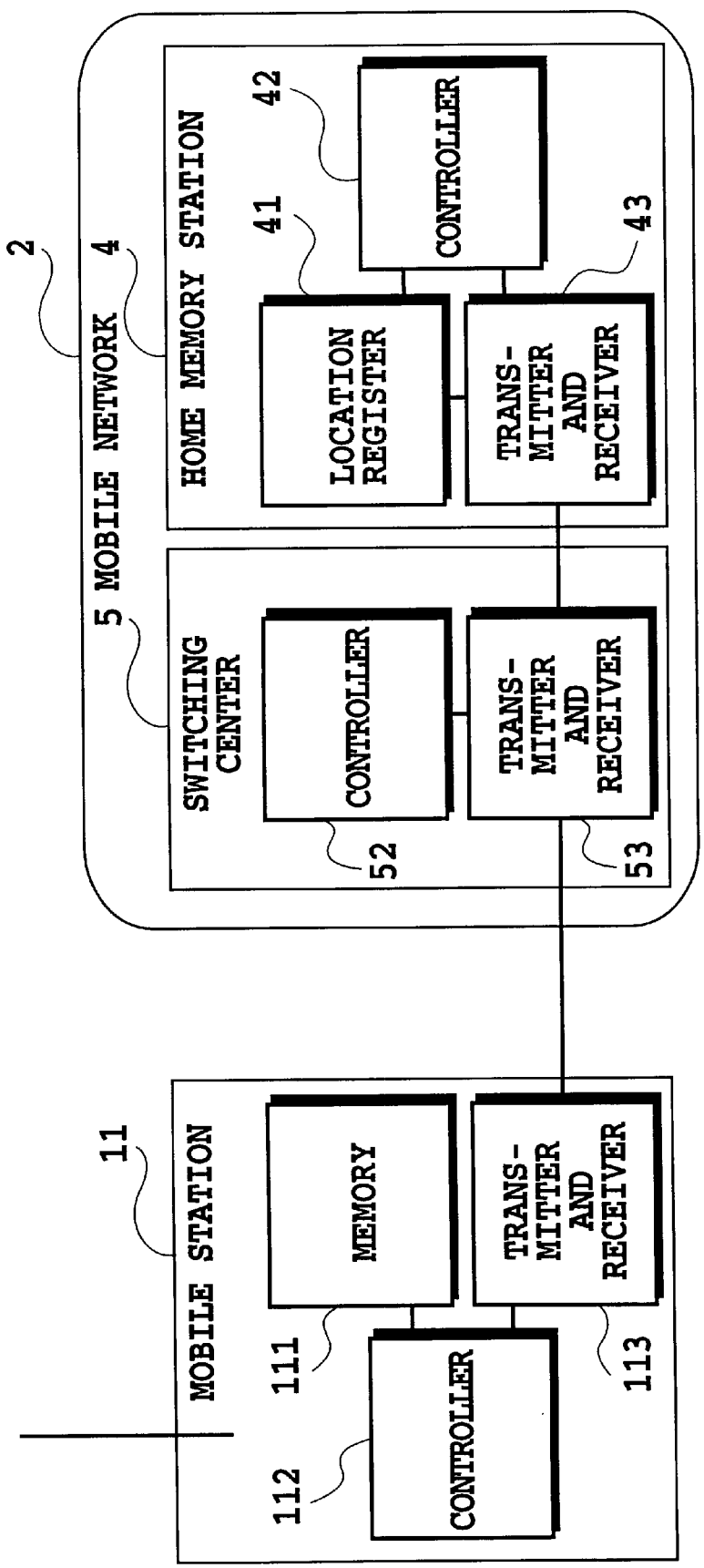
FIG. 3 is a block diagram showing a registration of a codec type in accordance with the present invention.
Figure 4:
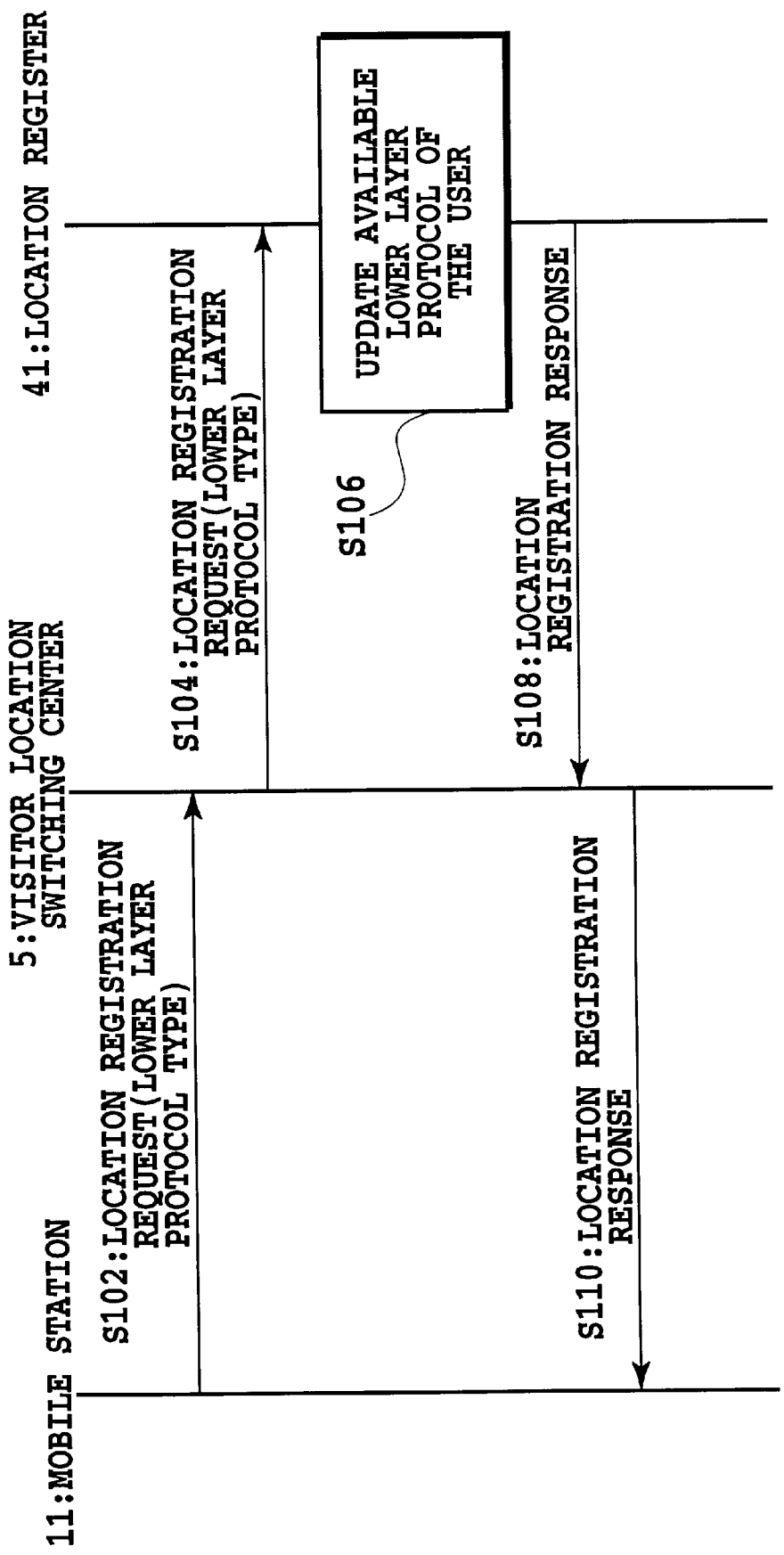
FIG. 4 is a sequence chart illustrating a sequence for registering the codec type.

FIG. 3 is a block diagram showing a registration of a codec type in accordance with the present invention, and FIG. 4 is a sequence chart illustrating a sequence for registering the codec type in detail.

In FIG. 3, a mobile station 11 notifies, when it conducts its location registration or replaces an old user mobile station, a visitor location switching system (switching center) 5 of a codec type the mobile station 11 supports, using a mobile communication control signal between the mobile station and the mobile network.

The operation of the mobile station 11 will now be described in more detail. When a controller 112 in the mobile station 11 detects the location registration of the mobile station 11 or the first use of the new mobile station (replaced mobile station), it transmits, to the visitor location switching center in the mobile network 2 through a transmitter and receiver, the codec types that are supported by the mobile station and stored in its memory 111 in advance.

Receiving the notification, the visitor location switching system 5 writes the change of the codec type into a location register 41, that is, a database in a home memory station 4 controlling the mobile network 2, the database storing locations or the like of mobile stations.

The operation at the mobile network side will be described in more detail. The visitor location switching system 5, detecting the reception of the codec update notification with a controller 52 through a transmitter and receiver 53, requests the codec update of the home memory station 4. Detecting the codec update request by a controller 42 through a transmitter and receiver 43, the home memory station 4 updates the registration of the codec type in the location register corresponding to the mobile station 11.

Thus, the mobile station 11 can register its codec type in the mobile network 2 using the mobile communication control signal. Since the mobile network 2 can always obtain the latest codec types of the mobile station, the discrepancy is canceled between the codecs supported by the mobile station and the codecs registered in the mobile network.

Referring to the sequence chart of FIG. 4, the sequence of communications between the mobile station 11 and mobile network 2 will be described in more detail. In FIG. 4, the mobile station 11 outputs a location registration request (S102) when it enters the service area of a new visitor location switching system 5. In the present invention, a lower layer protocol type, for example, a codec type, is added to the location registration request. The location registration request including the additional lower layer protocol type (codec type) is transmitted from the visitor location switching system 5 to the home memory station in which the location register 41 is installed (S104), so as to conduct the location registration and the update of the lower layer protocol type (codec type) available by the user (mobile station) (S106). When completing the registration update, the home memory station 4 transmits the location registration response (S108) to the mobile station 11 (S110) through the visitor location switching system 5.

Although the registration of the lower protocol type is executed by adding the lower layer protocol type (codec type) to the location registration request in FIGS. 3 and 4, the registration request and response can be carried out by providing an additional sequence for conducting the registration of the lower layer protocol type independently of the location registration request. It is obvious that the foregoing sequence is also carried out when the user replaces his or her mobile station (uses a new mobile station).

Using the mobile communication control signal between the mobile station and the mobile network in the foregoing sequence enables the location register to update the mobile user codec type quickly, and this makes it possible to maintain the consistency of the data between the user and the network.

Figure 5:
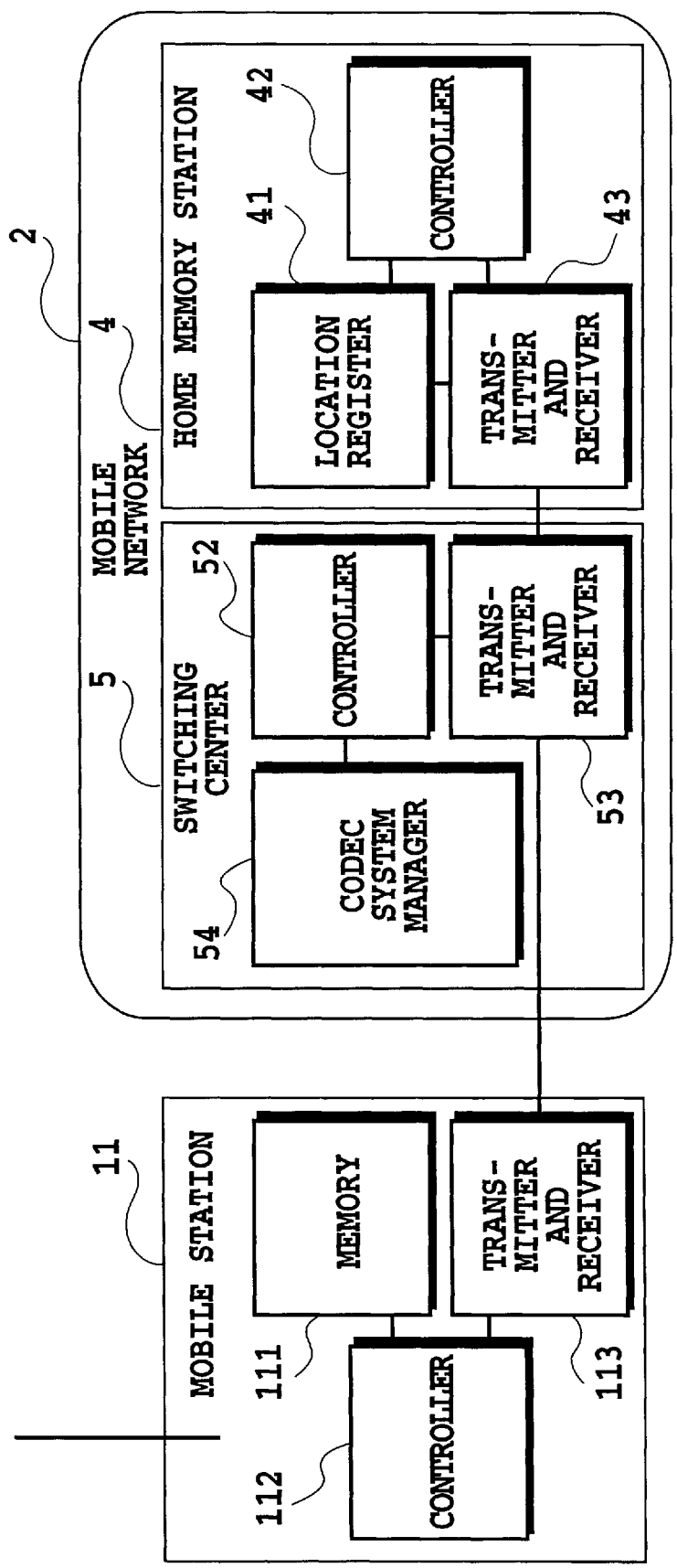
FIG. 5 is a block diagram showing another registration of codec types in accordance with the present invention.
Figure 6:
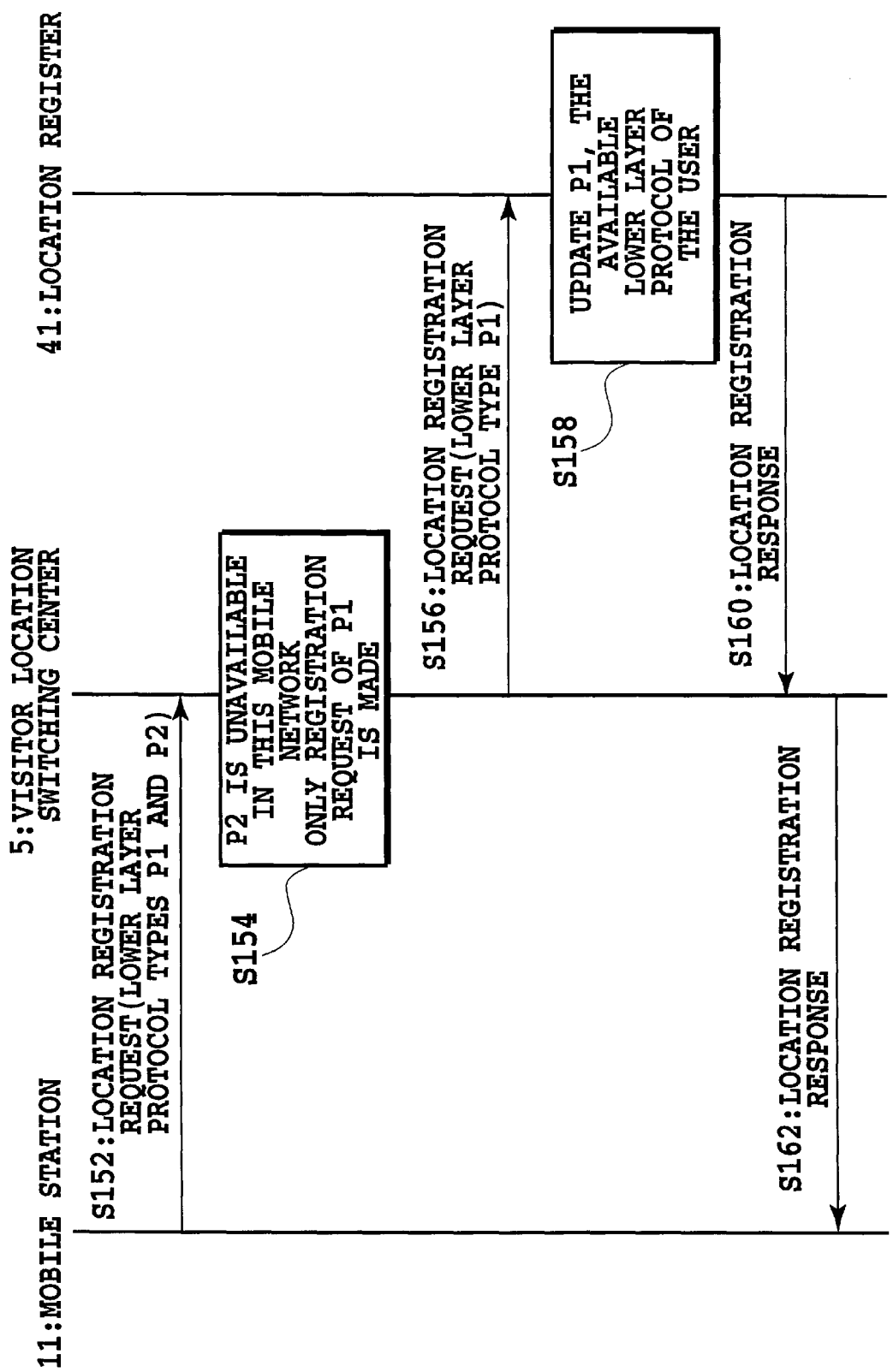
FIG. 6 is a sequence chart illustrating a sequence for registering the codec types.

Referring to FIGS. 5 and 6, another example will now be described in which the mobile station supports a plurality of codes types.

FIG. 5 is a block diagram illustrating the registration of the plurality codec types supported by the mobile station, and FIG. 4 is a sequence chart illustrating a sequence of communications between the mobile station and the mobile network during the registration.

In FIG. 5, the mobile station 11 transmits to the visitor location switching system 5 a mobile control signal with adding the codec types P1 and P2 to the location registration request as in FIG. 3. This is performed by the mobile station 11, in which the controller 112 transmits through the transmitter and receiver 113 the codec types that are supported by the mobile station and stored in the memory 111 in advance.

Detecting with the controller 52 that the codec types are received from the mobile station 11 through the transmitter and receiver 53, the visitor location switching system 5 inquires of a codec system manager 54 about the codec types supported by the visitor location switching system 5, and acquires the codec type P2 supported by it. The controller 52 transfers to the home memory station 4 including the location register 41 only the codec type P2 supported by the visitor location switching system 5 associated with the current location of the mobile station.

The home memory station 4 updates the location register 41 by the controller 42 using the codec type P2 received through the transmitter and receiver 43. This makes it possible to maintain the consistency between the codecs supported by the mobile network 2 and the codecs supported by the mobile station 11, thereby eliminating the call loss due to the inconsistency.

In the sequence chart as shown in FIG. 6, the mobile station 11 sends a location registration request to the visitor location switching system 5 associated with the current location of the mobile station (S152), with providing the location registration request with the lower layer protocol types (codec types) P1 and P2 as in FIG. 4. Receiving the request, the visitor location switching system 5 adds to the location registration request only the codec type P1 which is supported by the visitor location switching system 5 (S154), and transfers the request to the home memory station (S156). The home memory station updates the location register 41 using the location information transferred as well as the additional codec type P1 in the lower layer protocol (S158). Then, the home memory station sends a location registration response through the visitor location switching center (S160) to the mobile station 11 (S162).

Thus, only the codec type P1, which is supported by the mobile network (visitor location switching center) associated with the current location of the mobile station among the codec types P1 and P2 supported by the mobile station 11, is entered into the location register 41.

Although the registration of the lower protocol types is executed by adding the lower layer protocol types (codec types) to the location registration request in FIGS. 5 and 6, the registration request and response can be carried out by providing an additional sequence for conducting the registration of the lower layer protocol types independently of the location registration request.

The foregoing sequence is carried out not only when the location registration is conducted, but also when the user replaces his or her mobile station.

INDUSTRIAL APPLICABILITY

As described above, since the present invention updates the mobile user codec type(s) in the location register using the mobile control signal, it can establish the consistency of the data between the user side and the network side rather quickly as compared with a conventional system.

Furthermore, since the codec types, which the mobile network visited by the roaming user does not support among the codec types supported by the user, are not entered into the location register, the codec type the visited mobile network does not support is never selected, thereby preventing the call loss due to this reason.

What is claimed is:

1. A mobile communications system including a mobile station and a database of a mobile network which registers a location of the mobile station, comprising:

in said mobile station, means for storing one or more codec types supported by said mobile station;

in said mobile station, means for detecting a condition that the location of said mobile station is to be registered in said database;

in said mobile station, means for transmitting to said mobile network a signal for notifying said database of a change of the codec types supported by said mobile station in response to detection by said means for detecting, wherein the signal includes the codec types stored in said storing means;

in said database, means for receiving said signal from said means for transmitting to detect the notification of change of codec types; and in said database, means for updating codec types registered in accordance with the change of codec types detected.

2. The mobile communications system as claimed in claim 1, wherein:

said mobile network comprises a switching center interposed between said mobile station and said database; and said switching center transfers to said database only a codec type supported by said switching center among the codec types transmitted to said switching center from said mobile station.

3. The mobile communications system as claimed in claim 1 or 2, wherein:

said signal for notifying said change of the codec types is added to a request for location registration.

4. The mobile communications system as claimed in claim 1 or 2, wherein:

said change of the codec types is transmitted to said mobile network from said mobile station independently of a request for location registration.

5. A mobile station in a mobile communications system including a database of a mobile network which registers a location of the mobile station, comprising:

means for storing one or more codec types supported by said mobile station;

means for detecting a condition that the location of said mobile station is to be registered in said database; and means for transmitting to said mobile network a signal for notifying said database of a change of the codec types supported by said mobile station in response to detection by said means for detecting, wherein the signal includes the codec types stored in said storing means.

6. The mobile station as claimed in claim 5, wherein:

in said signal, said change of codec types is added to a request for location registration.

7. The mobile station as claimed in claim 5, wherein:

said change of codec types is transmitted to said mobile network from said mobile station independently of a request for location registration.

* * * * *